(12) United States Patent
Okada et al.

(10) Patent No.: US 8,839,565 B2
(45) Date of Patent: Sep. 23, 2014

(54) EXTRUDED VEHICLE DOOR SASH

(75) Inventors: Takayuki Okada, Aichi (JP); Jun Makita, Aichi (JP); Kenji Shimizu, Aichi (JP); Atsuo Noda, Aichi (JP); Go Yamane, Aichi (JP); Kazuyoshi Yokota, Aichi (JP)

(73) Assignee: Shiroki Corporation, Kanagawa (JP)

( * ) Notice: Subject to any disclaimer, the term of this patent is extended or adjusted under 35 U.S.C. 154(b) by 226 days.

(21) Appl. No.: 12/784,687

(22) Filed: May 21, 2010

(65) Prior Publication Data
US 2010/0293863 A1    Nov. 25, 2010

(51) Int. Cl.
*B60J 5/04*    (2006.01)

(52) U.S. Cl.
CPC ................................. *B60J 5/0402* (2013.01)
USPC ............... 49/502; 49/380; 49/440; 296/146.2

(58) Field of Classification Search
CPC ...... B60J 5/0402; B60J 5/0405; B60J 5/0406; B60J 5/0455; B60J 5/0466
USPC ............. 49/380, 428, 440, 441, 489.1, 492.1, 49/502, 504; 296/146.2
See application file for complete search history.

(56) References Cited

U.S. PATENT DOCUMENTS

| | | | |
|---|---|---|---|
| 4,969,295 A * | 11/1990 | Nishikawa et al. | 49/502 |
| 5,209,019 A * | 5/1993 | Morita | 49/490.1 |
| 5,226,259 A * | 7/1993 | Yamagata et al. | 49/502 |
| 5,743,047 A * | 4/1998 | Bonne et al. | 49/490.1 |
| 6,237,287 B1 * | 5/2001 | Nakagawa et al. | 49/479.1 |
| 6,668,490 B2 * | 12/2003 | Hock et al. | 49/502 |

FOREIGN PATENT DOCUMENTS

| | | |
|---|---|---|
| JP | 10-264654 A | 10/1998 |
| JP | 11-222035 A | 8/1999 |
| JP | 2003-063250 A | 3/2003 |
| JP | 2003-312265 A | 11/2003 |
| JP | 2004-338603 A | 2/2004 |

OTHER PUBLICATIONS

Japanese Office Action dated Feb. 5, 2013 for corresponding JP Application No. 2008-297715.
Official Action dated Oct. 15, 2013, related to corresponding Japanese Patent Application No. 2008-297715.

\* cited by examiner

*Primary Examiner* — Katherine Mitchell
*Assistant Examiner* — Catherine A Kelly
(74) *Attorney, Agent, or Firm* — Millen, White, Zelano & Branigan, P.C.

(57) ABSTRACT

A vehicle door sash having a uniform cross-sectional shape is provided, including an enclosed section on a vehicle inner side, and an outer extending wall which extends from the enclosed section toward the vehicle outer side, the enclosed section provided with inner and outer walls, with respect to a vehicle width direction, a body-side wall, and a window-opening-side wall that is adjacent to a window glass of the vehicle door. A weather strip is abutted against the body-side of the outer extending wall, and a glass runner is abutted against the window side of the outer extending wall. The body-side wall of the enclosed section is straight in cross section. A thickness of at least one of the inner and outer walls of the enclosed section is greater than a thickness of each of the body-side wall and the window-opening-side wall.

25 Claims, 6 Drawing Sheets

EXTRUDED VEHICLE DOOR SASH

BACKGROUND OF THE INVENTION

1. Field of the Invention

The present invention relates to a vehicle door sash that is formed by extrusion molding.

2. Description of Related Art

A vehicle door sash that is formed using an aluminum alloy extruded product with the purpose of reducing the weight of the vehicle door sash, instead of using a conventional rolled product of an iron-based material, has been proposed and been made practically viable (Japanese Unexamined Patent Publication No. 2007-145282).

However, although an extruded vehicle door sash is advantageous with regard to weight reduction, it is a technical challenge to maintain a desired strength while achieving a reduced material-thickness. In particular, in an extruded product, unlike in the case of a rolled product, it is necessary to carry out a subsequent process (vertical-pillar sash bending process) on the linearly extruded material in accordance with the curvature (bulging shape) of the vehicle body in the lateral (vehicle width) direction in the case of a vertical-pillar sash, and it is essential to carry out a subsequent process (upper sash bending) on the linearly extruded material in accordance with the side-surface shape of the sash in the case of an upper sash. Hence, this linearly extruded material requires a predetermined strength so as not to buckle during the above-mentioned subsequent processes.

SUMMARY OF THE INVENTION

The present invention achieves an extruded vehicle door sash that provides a door sash structure (sectional shape) having a well balanced strength while attaining a reduced thickness and a reduced weight.

According to an aspect of the present invention, a vehicle door sash is provided, on a vehicle door which opens and closes a door opening of a vehicle body, the vehicle door sash defining a window opening of the vehicle door in which a window glass is provided, wherein the vehicle door sash is formed as an extruded product of a metal material having a uniform cross-sectional shape and includes an enclosed section provided on a vehicle inner side, the enclosed section provided with an inner wall and an outer wall, with respect to a vehicle width direction, a body-side wall, and a window-opening-side wall that faces said window opening of said vehicle door; and an outer extending wall which extends from the enclosed section toward the vehicle outer side, wherein a weather strip is abutted against the body-side of the outer extending wall, and a glass runner is abutted against the window side of the outer extending wall, the window glass being movable up against and down away from the glass runner. The body-side wall of the enclosed section is straight in cross section, and a thickness of at least one of the inner and outer walls of the enclosed section is greater than a thickness of each of the body-side wall and the window-opening-side wall.

In another embodiment, a vehicle door sash is provided, on a vehicle door which opens and closes a door opening of a vehicle body, the vehicle door sash defining a window opening of the vehicle door in which a window glass is provided, wherein the vehicle door sash is formed as an extruded product of a metal material having a uniform cross-sectional shape and includes a U-shaped section provided on a vehicle inner side, the U-shaped section provided with an inner wall and an outer wall, with respect to a vehicle width direction, and a body-side wall; and an outer extending wall which extends from the U-shaped section toward the vehicle outer side, wherein a weather strip is abutted against the body-side of the outer extending wall, and a glass runner is abutted against the window side of the outer extending wall, the window glass being movable up against and down away from the glass runner. The body-side wall of the U-shaped section is straight in cross section, and a thickness of at least one of the inner and outer walls of the U-shaped section is greater than a thickness of the body-side wall.

It is desirable for a surface on the body side of the body-side wall to define a base of a weather strip retaining groove, and for a weather strip retaining rim to be provided along an end of the body-side wall on the vehicle inner side, the weather strip retaining rim extending towards the vehicle outer side.

It is desirable for a die-receiving flat surface to be provided on the vehicle inner side of the outer extending wall, wherein a die abuts the die-receiving flat surface when the door sash is bent to form a curve in accordance with a curved shape of the vehicle door in the vehicle-width direction.

A design part can be integrally formed on the vehicle outer side of the outer extending wall, wherein the design part is exposed on an outer surface of the vehicle door.

A design part can be provided as a separate component from the door sash and is fixedly attached to the outer extending wall at the vehicle outer side thereof, wherein the design part is exposed on the outer surface of the vehicle door.

It is desirable for a recess to be formed on the outer wall, wherein the recess is recessed toward the vehicle inner side and holds the glass runner, and for the outer wall to be in the form of a crank shape in cross section that defines an outer external wall and an inner external wall.

It is desirable for the external wall having the greatest sectional length out of the outer external wall and the inner external wall, of the crank shaped outer wall, to have a greater thickness than the thickness of each of the body-side wall and the window-opening-side wall.

It is desirable for the thickness of the outer extending wall to gradually increase from the vehicle outer side to the vehicle inner side.

In an embodiment, a vehicle door is provided, including the vehicle door sash according to the above-described configuration.

According to the present invention, in an extruded vehicle door sash provided with an enclosed section (or a U-shaped section) that is positioned on a vehicle inner side, and a vehicle outer-side extending wall that extends from the enclosed section (or U-shaped section) to a vehicle outer side, a wall on the body side that defines part of the enclosed section (or U-shaped section) is formed as a straight wall, and at least one of a vehicle inner-side wall and a vehicle outer-side wall of a pair of inner and outer walls that define part of the enclosed section (or U-shaped section) is formed with a larger wall thickness than the wall thickness of a wall on the body side and a wall adjacent to the window glass. According to this configuration, a high-strength extruded vehicle door sash can be achieved while attaining a reduced thickness and a reduced weight.

BRIEF DESCRIPTION OF THE DRAWINGS

The present invention will be discussed below in detail with reference to the accompanying drawings, in which.

DESCRIPTION OF THE EMBODIMENTS

Figure 1:
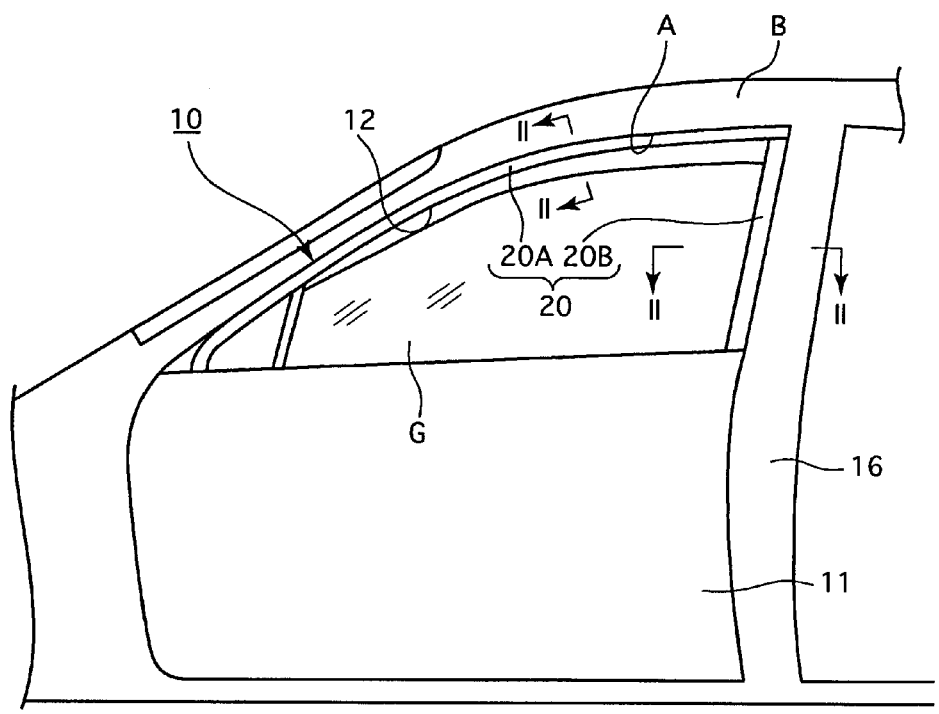
FIG. 1 is a side elevational view showing an example of a vehicle door to which an extruded vehicle door sash of the present invention is applied.

FIG. 1 shows a side elevational profile of part of a passenger automobile (vehicle) body to which a vehicle door sash of the present invention is applied. A vehicle door 10, which opens and closes a door opening (body opening) of a vehicle body B, is provided with a door sash (window frame) 20 which defines a window opening 12 of an upper part of a door body (inner panel and outer panel) 11.

The door sash 20 is provided with an upper sash 20A and a pillar sash 20B. The upper sash 20A is curved (bent), as viewed from the side thereof, and receives an upper edge of a window glass (window pane) G. The pillar sash 20B receives a vertical edge of the window glass G along a central pillar 16 of the vehicle body B. The lower portions of the upper sash 20A and the pillar sash 20B extend into and are fixed to the inside of the door body 11. The upper end of the pillar sash 20B and an end of the upper sash 20A are fixedly connected to each other by a conventional method.

The present embodiment is applied to the door sash 20. The upper sash 20A is bent so as to define a curve mainly in accordance with the side elevational profile of the door sash 20. The pillar sash 20B is bent so as to define a curve mainly in accordance with the bulging profile of the vehicle door 10 in the vehicle-width direction; however, since the basic sectional shapes of the upper sash 20A and the pillar sash 20B are the same (or can be made to be the same), the door sash 20 is used in the following descriptions as a generic term for the upper sash 20A and the pillar sash 20B.

Figure 2:
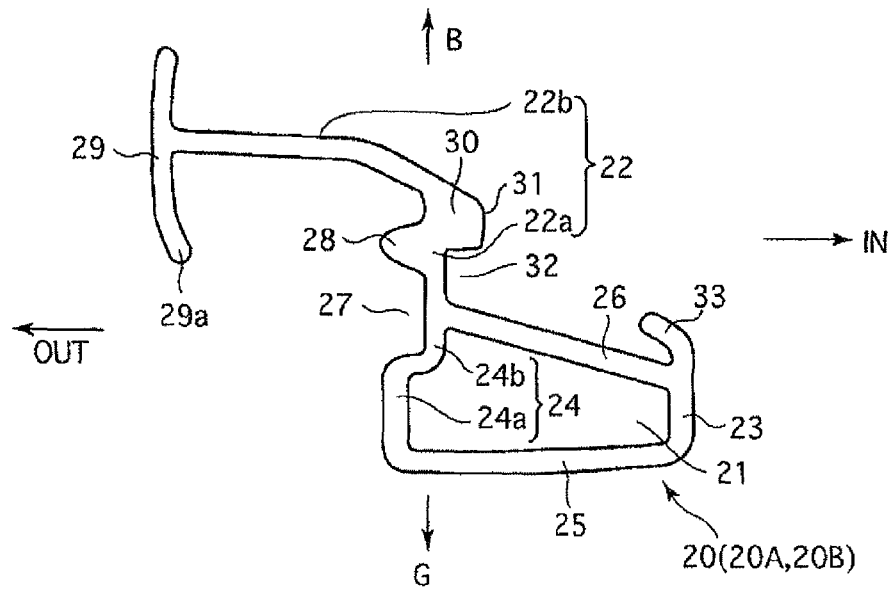
FIG. 2 is a cross sectional view of a single door sash as viewed in the direction of the arrows II-II shown in FIG. 1.
Figure 3:
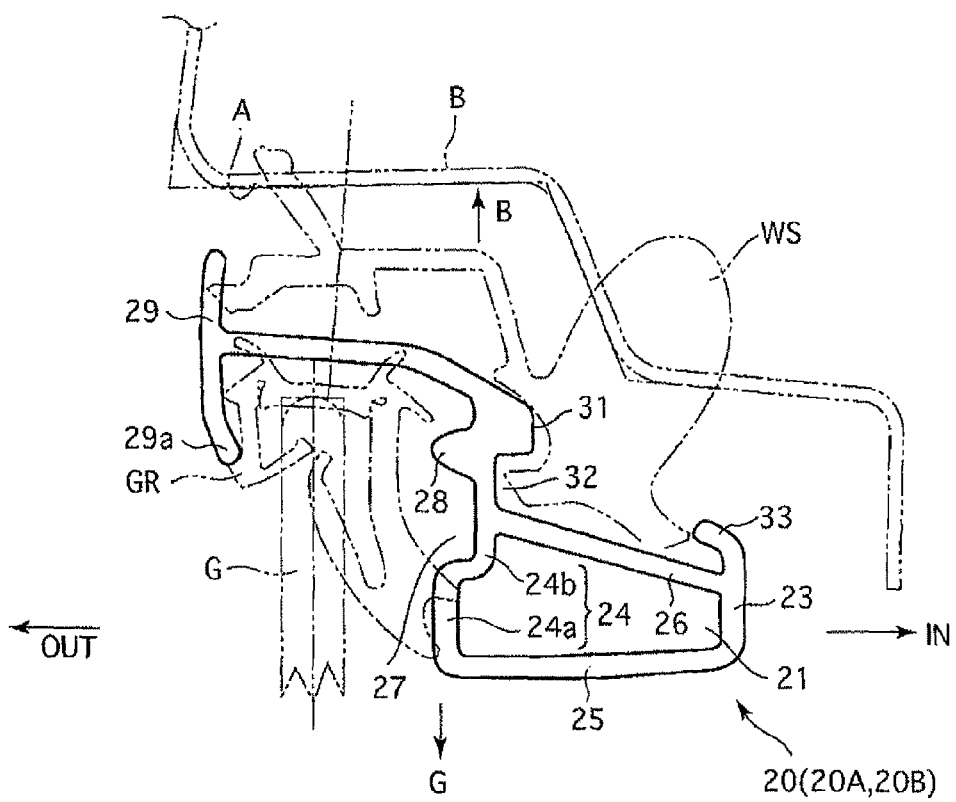
FIG. 3 is a cross sectional view of the door sash together with surrounding members that are indicated by chain lines.

FIGS. 2 and 3 show a first embodiment of the door sash 20 according to the present invention. The door sash 20 has a uniform sectional shape that is formed by extrusion molding an aluminum alloy, via which a straight molded product is obtained immediately after the extrusion molding process. Although the drawings only show cross sectional views of the door sash 20, the uniform sectional shape thereof is continual in a direction normal (perpendicular) to the page in FIGS. 2 and 3. The orientation/directions referred to in following descriptions are based on the vehicle outer side OUT and the vehicle inner side IN (in the vehicle width directions), the vehicle body B side and window-opening-side wall G side, as shown in the drawings.

The door sash 20 is provided with an enclosed section (hollow section) 21 at the vehicle inner side IN, and an outer-extending wall 22 which extends toward the vehicle outer side OUT from the enclosed section 21 so as to define an L-shape. The enclosed section 21 is formed (defined) by a pair of walls, i.e., an inner wall 23 and an outer wall 24, in the vehicle width directions (on the vehicle inner side IN and the vehicle outer side OUT, respectively), and another pair of walls, i.e., an window-opening-side wall 25 and a body-side straight wall (body side wall) 26 provided on the window-opening-side wall G side and the vehicle body B side, respectively. The outer wall 24 is provided with a glass runner retaining recess 27, and the outer wall 24 is in the form of a crank shape in cross section having an outer external wall 24a and an inner external wall 24b. The outer wall 24 is greater in length than that of the inner wall 23. The window-opening-side wall 25 and the body-side straight wall 26, which extend from the respective (opposite) ends of the inner wall 23 to the corresponding ends of the outer wall 24, diverge toward the vehicle outer side OUT. Additionally, the window-opening-side wall 25 has a convex curved shape at the window-opening-side wall G side, whereas the body-side straight wall 26 is a straight (flat) wall that defines a body-side straight wall. The window-opening-side wall 25 has a convex curved sectional shape due to this wall being visibly exposed; if the window-opening-side wall 25 were to be a straight (flat) wall, even slight imperfections/unevenness would be undesirably visible. In other words, it is desirable for this window-opening-side wall 25 to have a minimum curvature suffice to hide any slight imperfections/unevenness, etc.

The wall thickness of the inner wall 23 and the wall thickness of the outer external wall 24a (the longer wall out of the outer external wall 24a and the inner external wall 24b in the vehicle longitudinal/vertical direction) of the outer wall 24 are greater than the wall thickness of each of the window-opening-side wall 25 and of the body-side straight wall 26. As a specific example, the wall thickness of each of the window-opening-side wall 25 and the body-side straight wall 26 can be 1.6 mm, and the wall thickness of each of the inner wall 23 and the outer external wall 24a can be 2.0 mm, etc.

The outer-extending wall 22 is provided with a longitudinal/vertical wall 22a and a vehicle-width wall 22b that extends from the longitudinal/vertical wall 22a toward the vehicle outer side OUT. The longitudinal/vertical wall 22a is flush (extending in a common plane) with the inner external wall 24b of the outer wall 24 of the enclosed section 21. A protrusion 28 is formed on the longitudinal/vertical wall 22a, on the vehicle outer side OUT, at a position on the body side of the recess 27. Furthermore, a design part (decorative part) 29, which is exposed on the outer surface of the vehicle door, is integrally formed on the vehicle outer side OUT of the vehicle-width wall 22b. The design part 29 is provided along the edge thereof, at the window-opening-side wall G side, with a glass runner retaining rim 29a that is bent toward the vehicle inner side. The recess 27, the protrusion 28, and the glass runner retaining rim 29a constitute (define) a glass runner retainer (abutting portion) for holding a glass runner GR (see FIG. 3) that is formed from a compound resin material and has a uniform cross-sectional shape. The glass runner GR is provided with a groove that receives an edge of the window glass G upon the window glass G moving to the closed position thereof. The glass runner GR can have any conventionally known shape and be formed from any conventionally known material.

In the illustrated embodiment, the design part 29 is substantially perpendicular to the vehicle-width wall 22b of the outer-extending wall 22 and is not perpendicular to the body-side straight wall 26.

A protrusion 30 is formed on the vehicle inner side IN of the vehicle-width wall 22b (of the outer-extending wall 22), and a die-receiving flat surface 31 is formed on the vehicle inner side IN of the protrusion 30, the die-receiving flat surface 31 lying on a plane that extends in a vehicle longitudinal/vertical direction. The die-receiving flat surface 31 constitutes a die-abutting surface to which a die abuts against when the whole door sash 20 is bent so as to form a curve in accordance with the bulging (curved) shape of the vehicle door in the vehicle-width direction. The protrusion 30 forms a weather strip retaining groove 32 between the protrusion 30 and the body-side straight wall 26. Furthermore, a weather strip retaining rim 33 is formed along the edge at the vehicle inner side IN of the body-side straight wall 26. The weather strip retaining rim 33 is bent towards the vehicle outer side OUT. The surface on the body side of the body-side straight wall 26 defines a base of the weather strip retaining groove 32. A weather strip WS having a uniform cross-sectional shape (see FIG. 3) is supported by (abuts) the weather strip retaining groove 32 and the weather strip retaining rim 33, and also extends along the vehicle-width wall 22b of the outer extending wall 22. The weather strip WS, which achieves a watertight seal upon the vehicle door 10 being closed, can have any conventionally known shape and be formed from any conventionally known material.

Figure 4:
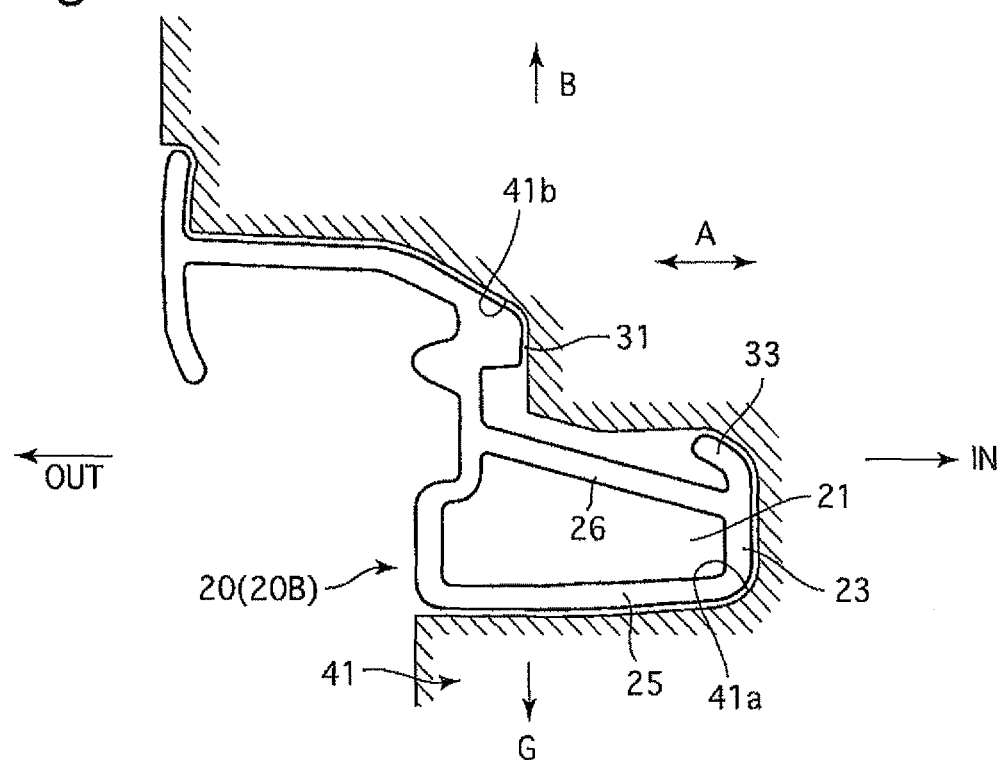
FIG. 4 is schematic cross sectional view showing a state in which the extruded vehicle sash, of the present invention, is subject to a bending process using a pillar-sash bending die.
Figure 5:
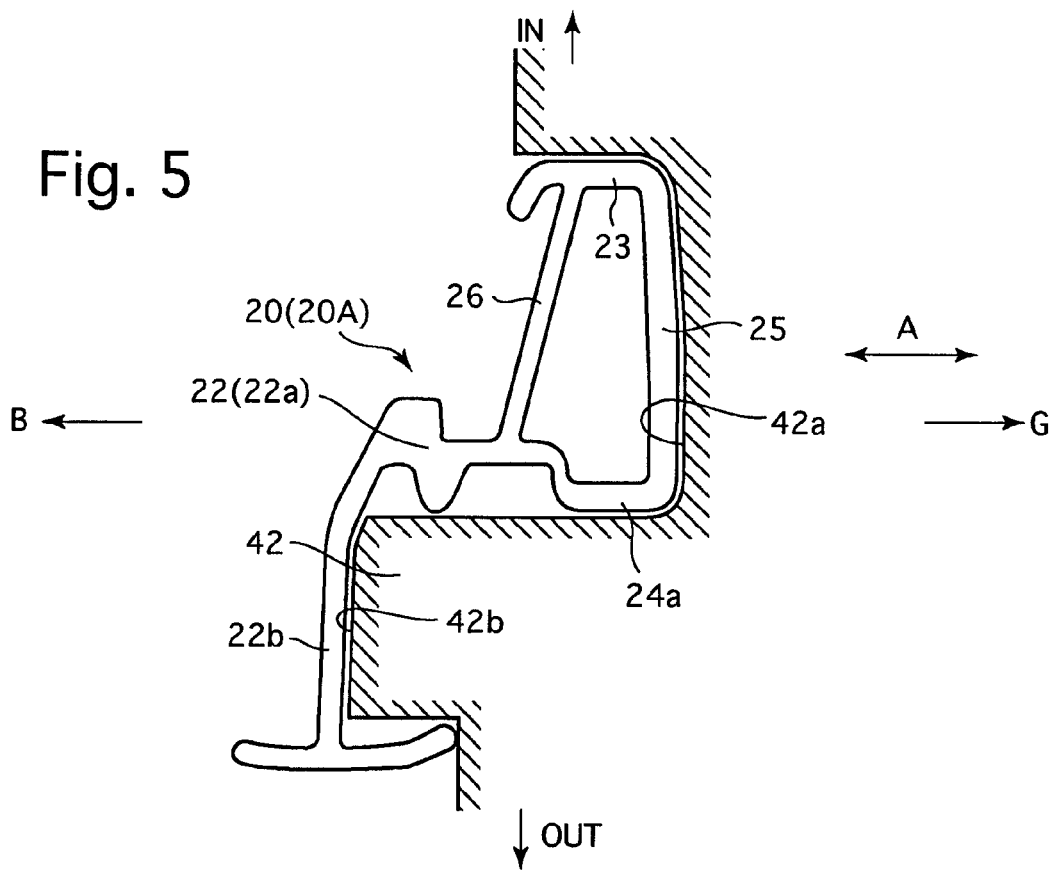
FIG. 5 is schematic cross sectional view showing a state in which the extruded vehicle sash, of the present invention, is subject to a bending process using an upper-sash bending die.

The door sash 20, having the above-described construction, is first extruded, and thereafter is subject to a bending process. This bending process includes carrying out a pillar-sash bending process on the pillar sash 20B in accordance in the bulging shape in the lateral (vehicle width) direction of the vehicle door, and carrying out an upper-sash bending process on the upper sash 20A in accordance with the side elevational profile thereof. FIG. 4 shows a pillar sash bending die 41 and the door sash 20 (pillar sash 20B) inserted into the pillar sash bending die 41. FIG. 5 shows an upper-sash bending die 42 and the door sash 20 (upper sash 20A) inserted into the upper-sash bending die 42. Both of the pillar sash bending die 41 and the upper-sash bending die 42 shown in FIGS. 4 and 5, respectively, bend the door sash 20 with respect to a straight line normal (orthogonal) to the page.

The pillar sash bending die 41 shown in FIG. 4 includes an accommodation recess 41a that accommodates the enclosed section 21 and the weather strip retaining rim 33 of the door sash 20 with the inner wall 23 of the door sash 20 positioned at the innermost portion of the accommodation recess 41a, and a receiving surface 41b which is provided along the die-receiving flat surface 31 and the outer extending wall 22 on the body side when the door sash 20 is inserted into the pillar sash bending die 41. When a bending action is applied to the door sash 20 (pillar sash 20B) via this pillar sash bending die 41, the body-side straight wall 26 of the enclosed section 21 prevents the door sash 20 from buckling. The higher the degree of coincidence between the direction of the body-side straight wall 26 and the direction of bending (i.e., the degree of orthogonality between the body-side straight wall 26 and the design part 29), the greater the buckling prevention effect. However, even if the body-side straight wall 26 is slightly inclined from the orthogonal direction with respect to the design part 29, as shown in the drawings, a considerably greater buckling prevention effect can be achieved compared to a corresponding body-side curved wall of the related art. In other words, since the curvature in the vehicle width direction that is applied to the door sash 20 in the pillar-sash bending process is smaller (i.e., the radius of curvature is greater) compared to the curvature (radius of curvature) along the roof curvature that is applied to the door sash 20 in the upper sash bending process, the body-side straight wall 26 is able to sufficiently prevent buckling from occurring. Furthermore, the die-receiving flat surface 31 abuts against the pillar sash bending die 41 to also prevent buckling from occurring so that the door sash 20 is formed into a smooth curve.

In the upper-sash bending die 42 shown in FIG. 5 includes an accommodation recess 42a that accommodates the enclosed section 21 and the longitudinal/vertical wall 22a of the outer extending wall 22 of the door sash 20 with the window-opening-side wall 25 of the door sash 20 positioned at the innermost portion of the accommodation recess 42a, and a receiving surface 42b provided along the glass-side of the vehicle-width wall 22b of the outer extending wall 22 when the door sash 20 is inserted into the upper-sash bending die 42. When a bending action is applied to the door sash 20 (upper sash 20A) via the upper-sash bending die 42, the inner wall 23 and the outer external wall 24a, which have a greater wall thickness than the thickness of each of the window-opening-side wall 25 and of the body-side straight wall 26, of the enclosed section 21 prevent the door sash 20 from buckling. In the upper sash bending process, as described above, since a large curvature (small radius of curvature) that corresponds to the roof curvature is applied to the door sash 20, by forming each of the outer external wall 24a and the inner wall 23 so as to have a greater wall thickness than the thickness of each of the window-opening-side wall 25 and of the body-side straight wall 26, buckling of the door sash 20 can be effectively prevented.

In the above-described embodiment, out of the outer external wall 24a and the inner external wall 24b of the outer wall 24 (of the enclosed section 21), only the outer external wall 24a has a thicker wall thickness (i.e., thicker than the thickness of each of the window-opening-side wall 25 and of the body-side straight wall 26); however, the inner external wall 24b can (also or alternatively) have a similarly thicker wall thickness. In the case where only one of the outer external wall 24a and the inner external wall 24b is formed to have such a thicker wall thickness, it is desirable for the longest (sectional length) outer wall (24a or 24b) in the vehicle longitudinal/vertical direction to have such a thicker wall thickness.

Figure 6:
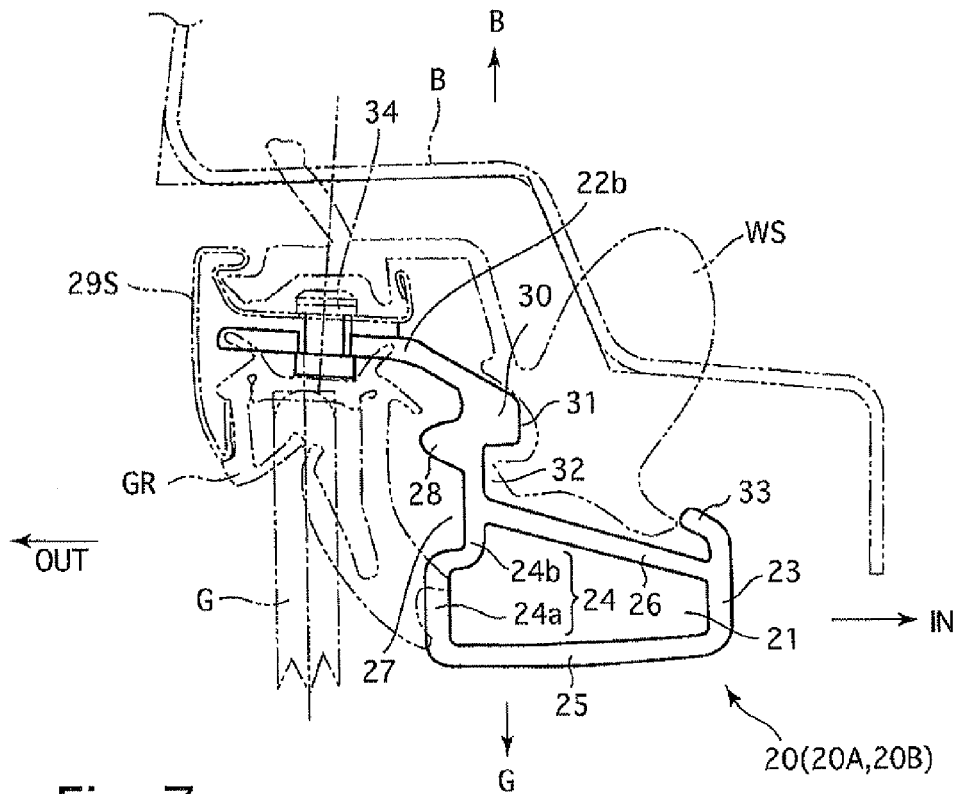
FIG. 6 is a cross sectional view, corresponding to FIG. 3, of an extruded vehicle door sash according to another embodiment of the present invention.

In the above-described embodiment, the design part 29 is integrally formed with the outer extending wall 22. However, as an alternative, an attachable design part 29S provided as a separate component from the door sash 20 (outer extending wall 22) can be fixedly attached to the vehicle-width wall 22b of the outer extending wall 22 on the vehicle outer side OUT. FIG. 6 shows an embodiment in which such an attachable design part 29S is applied, in which the attachable design part 29S is fixed to the vehicle-width wall 22b with fixing clips 34. The attachable design part 29S shown in this alternative embodiment is a rolled product of an iron-based material.

Figure 7:
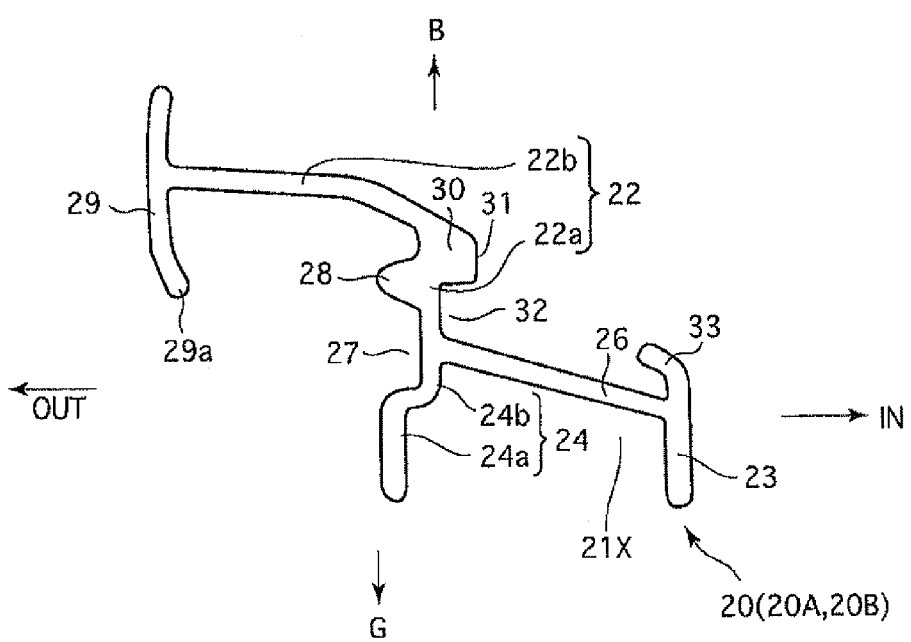
FIG. 7 is a cross sectional view, corresponding to FIG. 2, of an extruded vehicle door sash according to another embodiment of the present invention.

FIG. 7 shows another embodiment (second embodiment) of an extruded vehicle door sash, according to the present invention. In this second embodiment, the window-opening-side wall 25 of the enclosed section 21 has been removed (is not provided). In other words, instead of the enclosed section 21 of the first embodiment, an upside down U-shaped section 21X is formed (defined) by the inner wall 23, the outer wall 24 and the body-side straight wall 26. This second embodiment is the same as the first embodiment shown in FIGS. 2 through 5 except for the window-opening-side wall 25 (enclosed section 21) not existing, and hence, members in the second embodiment that are the same as those in the first embodiment are designated with the same numerals. According to the second embodiment, a lighter (in weight) vehicle door sash can be attained. It is desirable to apply this second embodiment to a rear door of the vehicle, since the strength requirements for a rear door are usually not as great as the strength requirements for a front door.

Figure 8:
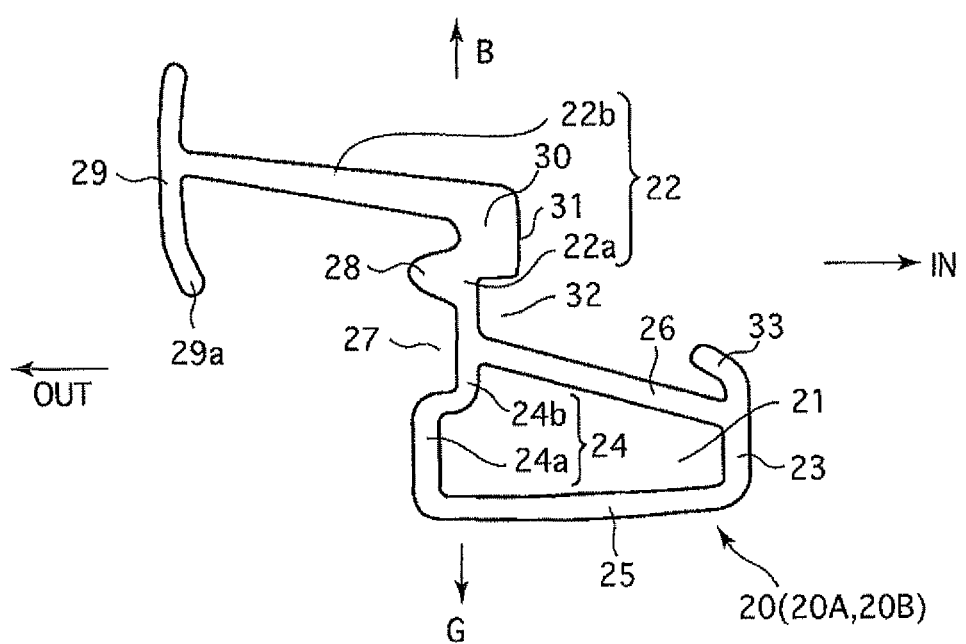
FIG. 8 is a cross sectional view, corresponding to FIG. 2, of an extruded vehicle door sash according to another embodiment of the present invention.

FIG. 8 shows another embodiment (third embodiment) of an extruded vehicle door sash, according to the present invention. In this third embodiment, the thickness of the vehicle-width wall 22b of the outer extending wall 22 is non-uniform from the vehicle outer side OUT to the vehicle inner side IN, in which the thickness gradually increases from the vehicle outer side OUT to the vehicle inner side IN. In the third embodiment, as shown in FIG. 8, the thickness of the vehicle-width wall 22b has been made gradually thicker toward the vehicle inner side IN based on the thickness of the vehicle outer side OUT of the vehicle-width wall 22b; however, conversely, the thickness of the vehicle-width wall 22b can be made gradually thinner toward the vehicle outer side OUT based on the thickness of the vehicle inner side IN of the vehicle-width wall 22b. According to the third embodiment, assuming that the cross-section area of the vehicle-width wall 22b is the same (i.e., the amount of metal material that is used is the same), by applying the above-described structure in which the thickness of the vehicle-width wall 22b from the vehicle outer side OUT to the vehicle inner side IN is increased, an increase in strength of the door sash 20 can be achieved.

Obvious changes may be made in the specific embodiments of the present invention described herein, such modifications being within the spirit and scope of the invention claimed. It is indicated that all matter contained herein is illustrative and does not limit the scope of the present invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding JP application No. 2008-297715, filed Nov. 21, 2008, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A vehicle door sash provided on a vehicle door, which opens and closes a door opening of a vehicle body, said vehicle door sash defining a window opening of said vehicle door in which a window glass is provided, wherein said vehicle door sash is formed as an extruded product of a metal material having a uniform cross-sectional shape taken in a direction orthogonal to the longitudinal direction of the vehicle door sash and comprises:
    an enclosed section provided on a vehicle inner side, said enclosed section provided with an inner wall and an outer wall, with respect to a vehicle width direction, a body-side wall, and a window-opening-side wall that faces said window opening of said vehicle door; and
    an outer extending wall which extends from said enclosed section toward the vehicle outer side, wherein a weather strip is abutted against the body-side of said outer extending wall, and a glass runner is abutted against the window side of said outer extending wall, said window glass being movable up against and down away from said glass runner,
    wherein said body-side wall of said enclosed section is straight in cross section, and
    wherein said outer wall comprises an outer external wall and an inner external wall, and wherein one of the entire said outer external wall and the entire said inner external wall, that is longer than the other of said outer external wall and said inner external wall, is thicker than said body-side wall and said window-opening-side wall.

2. The vehicle door sash according to claim 1, wherein a surface on the body side of said body-side wall defines a base of a weather strip retaining groove, and
    wherein a weather strip retaining rim is provided along an end of said body-side wall on the vehicle inner side, said weather strip retaining rim extending towards the vehicle outer side.

3. The vehicle door sash according to claim 1, wherein a die-receiving flat surface is provided on the vehicle inner side of said outer extending wall, that is capable of receiving a die when the door sash is bent to form a curve in accordance with a curved shape of the vehicle door in the vehicle-width direction.

4. The vehicle door sash according to claim 1, wherein a design part is integrally formed on the vehicle outer side of said outer extending wall, wherein said design part is exposed on an outer surface of said vehicle door.

5. The vehicle door sash according to claim 1, wherein a design part is provided as a separate component from said door sash and is fixedly attached to said outer extending wall at the vehicle outer side thereof, wherein said design part is exposed on the outer surface of said vehicle door.

6. The vehicle door sash according to claim 1, wherein a recess is formed on said outer wall, wherein said recess is recessed toward the vehicle inner side and holds said glass runner, and
    wherein said outer wall is in the form of a crank shape in cross section that defines an outer external wall and an inner external wall.

7. The vehicle door sash according to claim 6, wherein the outer wall is greater in length than said inner wall, and
    said outer wall, has a greater thickness than a thickness of said body-side wall and said window-opening-side wall.

8. The vehicle door sash according to claim 1, wherein the thickness of said outer extending wall gradually increases from said vehicle outer side to said vehicle inner side.

9. A vehicle door comprising the vehicle door sash according to claim 1.

10. A vehicle door sash provided on a vehicle door,
    which opens and closes a door opening of a vehicle body, said vehicle door sash defining a window opening of said vehicle door in which a window glass is provided, wherein said vehicle door sash is formed as an extruded product of a metal material having a uniform cross-sectional shape taken in a direction orthogonal to the longitudinal direction of the vehicle door sash and comprises:
        a U-shaped section provided on a vehicle inner side, said U-shaped section provided with an inner wall and an outer wall, with respect to a vehicle width direction, and a body-side wall; and an outer extending wall which extends from said U-shaped section toward the vehicle outer side, wherein a weather strip is abutted against the body-side of said outer extending wall, and a glass runner is abutted against the window side of said outer extending wall, said window glass being movable up against and down away from said glass runner, wherein said body-side wall of said U-shaped section is straight in cross section, and wherein said outer extending wall comprises an outer external wall and an inner external wall, and wherein one of the entire said outer external wall and the entire said inner external wall, that is longer than the other of said outer external wall and said inner external wall, is thicker than said body-side wall.

11. The vehicle door sash according to claim 10, wherein a surface on the body side of said body-side wall defines a base of a weather strip retaining groove, and wherein a weather strip retaining rim is provided along an end of said body-side wall on the vehicle inner side, said weather strip retaining rim extending towards the vehicle outer side.

12. The vehicle door sash according to claim 10, wherein a die-receiving flat surface is provided on the vehicle inner side of said outer extending wall, that is capable of receiving a die when the door sash is bent to form a curve in accordance with a curved shape of the vehicle door in the vehicle-width direction.

13. The vehicle door sash according to claim 10, wherein a design part is integrally formed on the vehicle outer side of said outer extending wall, wherein said design part is exposed on an outer surface of said vehicle door.

14. The vehicle door sash according to claim 10, wherein a design part is provided as a separate component from said door sash and is fixedly attached to said outer extending wall at the vehicle outer side thereof, wherein said design part is exposed on the outer surface of said vehicle door.

15. The vehicle door sash according to claim 10, wherein the thickness of said outer extending wall gradually increases from said vehicle outer side to said vehicle inner side.

16. A vehicle door comprising the vehicle door sash according to claim 10.

17. The vehicle door sash of claim 1 comprising an upper sash and a pillar sash, wherein said upper sash is formed so as to define a curve in accordance with a side elevation profile of said vehicle door sash.

18. The vehicle door sash of claim 10 comprising an upper sash and a pillar sash, wherein said upper sash is formed so as to define a curve in accordance with a side elevation profile of said vehicle door sash.

19. The vehicle door sash of claim 1, wherein said outer extending wall is provided with a protrusion to form a glass runner retainer for holding said glass runner.

20. The vehicle door sash of claim 10, wherein said outer extending wall is provided with a protrusion to form a glass runner retainer for holding said glass runner.

21. The vehicle door sash of claim 1 comprising an upper sash and a pillar sash, wherein said pillar sash is formed so as to define a curve in accordance with a bulging profile of the vehicle door.

22. The vehicle door sash of claim 10 comprising an upper sash and a pillar sash, wherein said pillar sash is formed so as to define a curve in accordance with a bulging profile of the vehicle door.

23. The vehicle door sash of claim 1 wherein said inner wall is straight in cross section.

24. The vehicle door sash of claim 1 wherein the thickness of said inner wall of said enclosed section is uniform.

25. The vehicle door sash of claim 10 wherein the thickness of said inner wall and of said outer wall of said U-shaped section is uniform.

\* \* \* \* \*